United States Patent Office 2,916,069
Patented Dec. 8, 1959

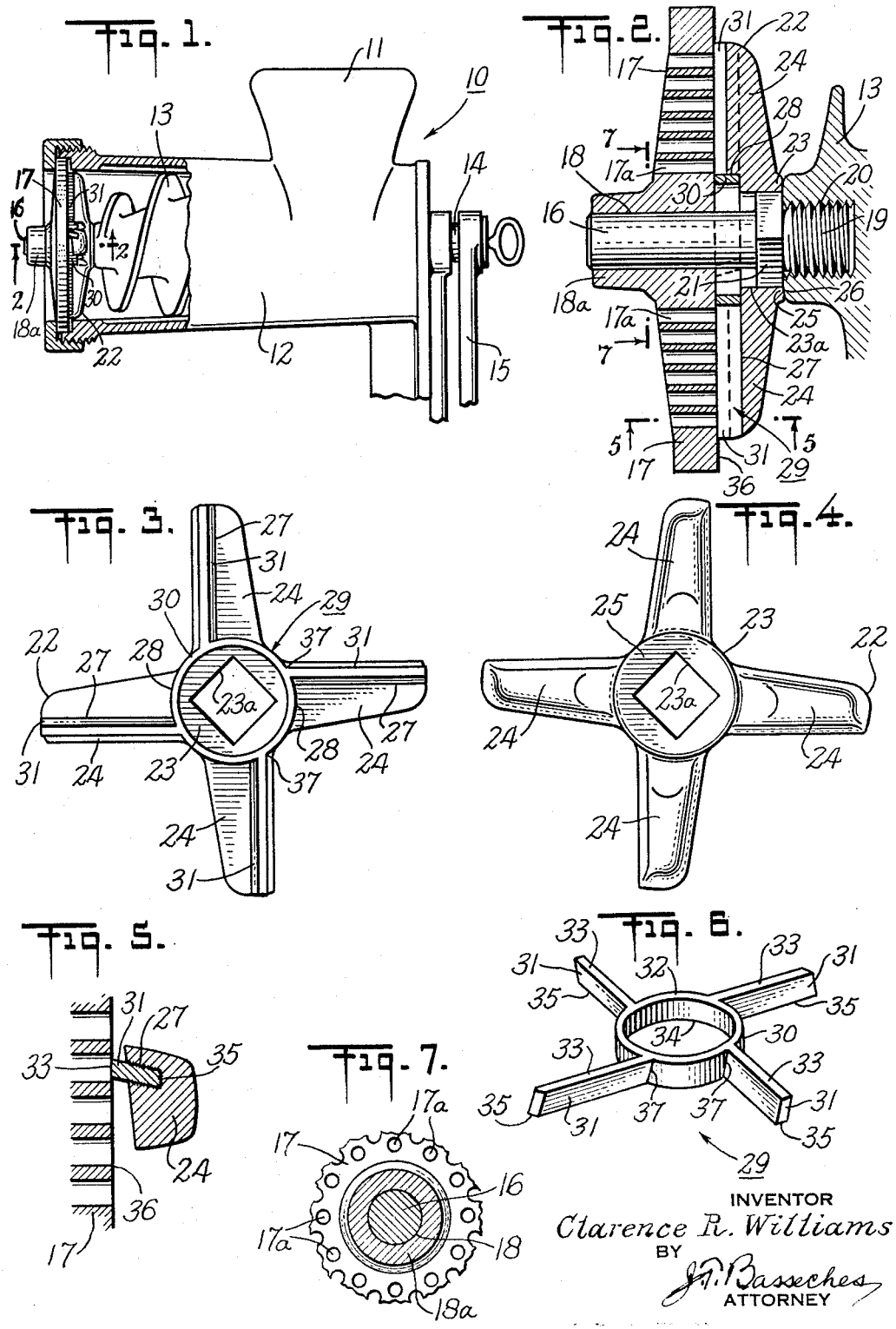

2,916,069

MEAT CHOPPER KNIFE ASSEMBLY HAVING DIFFERENT DEGREES OF WEAR CHARACTERISTICS

Clarence R. Williams, Brooklyn, N.Y., assignor to Atlantic Service Company, Inc., Brooklyn, N.Y., a corporation of New York Application February 10, 1956, Serial No. 564,785

1 Claim. (Cl. 146—189)

This invention relates to food choppers, and more particularly to cutter knives therefor.

My invention concerns itself with a class of food choppers and chopper knives or blades therefor in which a generally cylindrical tubular casing, open at one end and connected with a fill hopper, has a powerized screw axially rotatable in the casing, to project and extrude meat and like foodstuff in the direction of a perforated cutter plate. In such assembly, a cutter frame and cutter actively bear during rotation of the screw, to shear the foodstuff particularly meat, as it becomes extruded through the perforations in the plate.

An example of such a general assembly is shown in my Patent No. 2,636,530, granted April 28, 1953.

In my aforesaid patent, the expedient of providing renewable knife elements is disclosed, employing a radially armed cutter frame having substantially radially extended grooves, removably to receive blades in pairs, joined by a web which forms a bridge between the blades. The employment of such blades contemplates frequent replacement for sharpening and involves a construction in which the blade moves over the face of the perforated cutter plate normal to the plate, and the grooves are likewise so formed for the ready removal of such blades from the frame.

The solution of the problem of removability was at the expense of more efficient cutting, resulting also in a collection of entwined sinews adjacent the trailing bearing of the screw.

I have found that I may increase the efficiency of cutting by providing positive rake to create a more effective shearing and slicing of the foodstuff, particularly meat, as it is extruded adjacent the perforated plate by substantially integrating the knife adjacent the portion exposed to the maximum shearing stresses, whereby long life and efficient cutting are secured, to place a minimum load on the powerized unit, even though encountering relatively infrangible materials, such as sinews where meat is ground.

Still more particularly, it is an object of my invention to provide in a screw fed meat cutting machine wherein meat is chopped by the proximate rotation of a cutter assembly and a perforated cutter plate, a removable cutter frame having a cutter assembly radially supporting one or more cutter blades extending from and supported by a stud shielding annulus, thereby supporting a blade with positive rake and the cutting edge of each of said blades and the annulus lying a substantially in the same plane against the perforated cutter plate, efficiently supporting the cutting blades with positive rake against distortion and shielding the stud from the accumulation of sinews which may otherwise become entwined around and in back of the knife and obstruct free passage through the chopper bowl or casing.

Still more particularly, it is an object of my invention to provide in a meat cutting machine, a cutter assembly in which a highly efficient, self-sharpening cutting metal may be affixed in radial position and in an angular direction for positive rake, and to achieve long life and efficient cutting by supporting the axial section of the blades which extend or overhang from the supporting frame to so rigidify the assembled knife as to secure self-sharpening of the blades and shearing or slicing of the extruded meat, with maximum efficiency, while supporting the blade in a frame of more ductile and tougher metal, whereby the cutter may be stressed against the lands of the perforated cutter plate with minimum clearance and to permit renewable mounting of the cutter blade in its frame by reason of the minimum warping or buckling of the blade in the blade frame or holder.

Still more particulaly, it is an object of my invention to provide a self-sharpening cutter blade assembly for meat choppers having positive rake, whereby the cutting efficiency of the blade is increased, and further characterized by sustaining and supporting the blade members in a position to maintain positive rake, the supporting means serving to shield the stud of the meat cutter from accumulation of sinews to assure maximum continuous and uninterrupted use.

To attain these objects and such further objects as may appear herein or be hereinafter pointed out, I make reference to the accompanying drawing, forming a part hereof, in which:

Figure 1 is a side elevation, partly in section and with parts broken away, showing the knife assembly against a perforated plate in a meat grinder, in accordance with my invention;

Figure 2 is a magnified sectional fragmentary view on the line 2—2 of Figure 1;

Figure 3 is a magnified face view of the blade carrier frame in accordance with my invention;

Figure 4 is an enlarged rear view of the carrier frame;

Figure 5 is a fragmentary magnified section taken on the line 5—5 of Figure 2;

Figure 6 is an enlarged perspective view of the knife assembly before attachment to the knife frame;

Figure 7 is a fragmentary section taken on the line 7—7 of Figure 2.

Making reference to the drawing, there is disclosed a known representative type of meat or food chopper or grinder 10, having the usual fill hopper 11 leading to the tubular casing 12, within which the feed screw 13 rotates and which comprises a shaft 14 on one end, to which a handle lever 15 is connected, to supply the motive power, it being understood that a gear or belt may be substituted for the handle and may be connected to some motorized driving means, where manual means are not employed. The screw 13 has its shaft end 16 rotatably supported in the perforated cutter plate 17, in which is formed a bearing 18 to receive the shaft end 16, the bearing being on an extended portion of the cutter plate 17 by forming the same with a boss 18a.

In the illustration, the shaft end 16 may be integrally formed with the screw 13. Preferably, however, the shaft end 16 forms part of a stud 19 which is formed with a screw-threaded end engaging the threaded boring 20. The stud 19 is formed with a keyed or squared segment 21, to make positive connection with a cutter frame 22 whose hub 23 is formed with an aperture conforming to the keying segment 21 of the stud.

The cutter frame 22 is provided with radial arms 24. Adjacent the hub 23, an axial keying boring 23a corresponds to the contour of the keying segment 21 previously described as formed on the stud 19. The frame has a thrust or pressure face 25 at its leading edge for contact with the edge 26 of the screw 13. The trailing end, which constitutes the front face of the frame, is formed on the arms 24 with grooves 27. The grooves 27 are in radially offset position along the length of the arms 24 and are pitched to provide positive angular rake. The slots 27 extend for the full length of the arms 24, merging adjacent the hub in an internal annulus 28.

The frame so formed is arranged to receive a cutter blade assembly 29 comprising a ring 30, to which are affixed the blades 31, each of which is pitched in the plane of the ring 30 and is offset radially so as to correspond to the pitch and location of the grooves 27 and the annulus 28.

In the illustration in Figure 6, the exposed edge 32 of the ring 30 and the edges 33 of the blades are in a single plane. The outer diameter of the ring 30 is arranged to fit within the internal annulus 28 of the frame 22.

The frame 22 may be made of tough, ductile forging. The cutter blade assembly 29 is preferably made of steel which may be tempered to provide a lasting cutting edge. The cutter blade assembly 29 is arranged to have its rear edges 34 and 35 fit within the internal annulus 28 and the grooves 27, respectively, in which position they may be permanently or temporarily affixed. Known methods are used temporarily to affix the parts mentioned within the annulus and slots, such as by soldering, brazing, or by welding where a permanent affixing is found desirable.

The knife or cutter blade assembly 29, when combined with the frame 22, exposes the edges 32 and 33, which are arranged to contact the lands 36 of the cutter plate 17 with positive rake, providing a self-sharpening cutter assembly. The blades 31 are supported throughout their entire length in the slot 27 angularly, and with additional support adjacent the cutting edges 33 by the coupling made with the ring 30, to which the ends 37 of the blades 31 are welded.

In operation, as the cutter blade assembly 29 contacts the lands 36 of the perforated plate 17, the foodstuff or meat extruded by the screw 13 is efficiently sheared by the edges 33 by reason of the positive rake at which the blades 31 are maintained. The ring 30 shields the stud 19 and the stud keying portion 21 from access to the internal annulus 28 formed adjacent the hub of the frame 22. Tough or infrangible material or sinews are excluded, and are prevented from entwining themselves about the extended portion of the stud 19 and building up an obstruction, or interfering with the efficient operation of the cutter. For this purpose it is preferred that the ring 30 lie in close alignment with the innermost row of perforations 17a of the plate 17, to minimize deflection of the extruded meat against the lands of the perforated plate at the axis.

Continuity of shielding surfaces between the side faces of the blades 31, as provided by the ring 30, serves more efficiently to deflect the tougher meat material and sinews, to prevent obstruction of the passages of the perforated plate or warping pressure, to enhance the shearing action of the blades 31 in contact with the lands 36 of the plate 17.

Intimate engagement of the ends 37 of the blades 31 and the ring 30 as by welding or otherwise integrating the same to form a single unit adds rigidity to the overhang or extended cutting edges of the blades 31 as they protrude from the grooves of the arms 24 of the cutter frame.

Furthermore, the generally obtuse angle made by the blades 31 with the ring 30 to a large extent eliminates sharp corners. This serves to deflect the sinews and minimize their engaging and holding themselves to the ring.

While I have shown and described a knife assembly 29 and a stud sinew ring shield which may be formed as a single unit and which may be removably combined with the frame 22, I may embody the sinew ring in a frame 22 in which the arms are formed to be sharpened for direct contact with the perforated cutter plate 17, and it is contemplated within the scope of my invention to provide a sinew shielding annulus or ring between the axial end of the radial cutter blade and the stud, whether the cutter blades are integral with the cutter frame, separable, or removably combined therewith.

While I have shown and described a knife assembly 29 which may be made as a single unit, which may be removably combined with or separated from the frame 22, making due allowances for clearances in affixing the same in the depth and width of the grooves 27, I may incorporate the separate components of the knife assembly individually with the frame 22. This I may do by separately first affixing the ring 30 to the frame 22, and thereafter affixing each of the blades 31 in the corresponding grooves 27, or reverse the procedure. When the pieces are so mounted, they are affixed in position by soldering, brazing or welding in the manner previously described, and where soldering or brazing is employed, these parts may be removable from the frame 22 by known means.

Likewise, the support or integration of the ring 30 and blade edges at the portion 37, as by welding or otherwise integrating to obtain the additional rigidity for the overhang, may be effected after the ring 30 and the separate blade elements 31 have been affixed in position on the frame 22.

Another feature of my invention, by the procedure just described, is to assure a greater degree of uniform wear of the assembly and for this purpose I may make the ring 30 of a metal which will wear at a faster rate than the knife blades 31. This I may do by selection of metals or a change in the hardening operation. Thereby, the rate of wear will be greater upon the ring or upon that portion of the assembly adjacent the inner ends of the blade, minimizing the formation of undesirable clearances as the knife blades and the assembled ring wear down. This differential hardness radially of the assembly will minimize the formation of gaps at the axial support of the blades and assures a longer effective cutting surface.

Having thus described my invention and illustrated its use, what I claim as new and desire to secure by Letters Patent, is:

A knife assembly for a screw fed meat chopper having a cutter frame and cutter plate adjacent the axially terminating element thereof wherein said meat or like food is chopped by the proximate rotation of a cutter frame assembly and a cutter plate and wherein the cutter plate is formed with an axially continuous end thrust bearing surface and said knife assembly comprises a frame and separably affixed cutter blade elements, the axially terminating element whereof is arranged to contact the continuous end thrust bearing surface of the cutter plate, the blade terminating elements contacting the continuous end thrust bearing surface having different degrees of wear characteristics, with the axially terminating element adjacent the inner ends of the blade portion having a greater rate of wear, the wear surfaces being in the same plane whereby the contacting surface is maintained substantially flat and the formation of undesirable clearances and gaps at the axial support between the blade and the cutter plate is minimized, said axially terminating element constituting a ring forming a hollow integral stud shield adjacent the axially terminating portion of the frame, holding the radial blades against displacement at such portions.

References Cited in the file of this patent
UNITED STATES PATENTS

| | | |
|---|---|---|
| 756,713 | Sander | Apr. 15, 1904 |
| 1,607,214 | Smith | Nov. 16, 1926 |
| 1,869,220 | Klod | July 26, 1932 |
| 2,229,845 | Gold | Jan. 28, 1941 |
| 2,337,604 | Hess | Dec. 28, 1943 |
| 2,472,876 | Ahrndt et al. | June 14, 1949 |
| 2,679,874 | Schmidt | June 1, 1954 |

FOREIGN PATENTS

| | | |
|---|---|---|
| 685,821 | Germany | Jan. 11, 1940 |